Sept. 30, 1952  E. E. SCHATZ ET AL  2,612,345
TRACTOR ATTACHMENT
Filed Nov. 13, 1945  2 SHEETS—SHEET 1
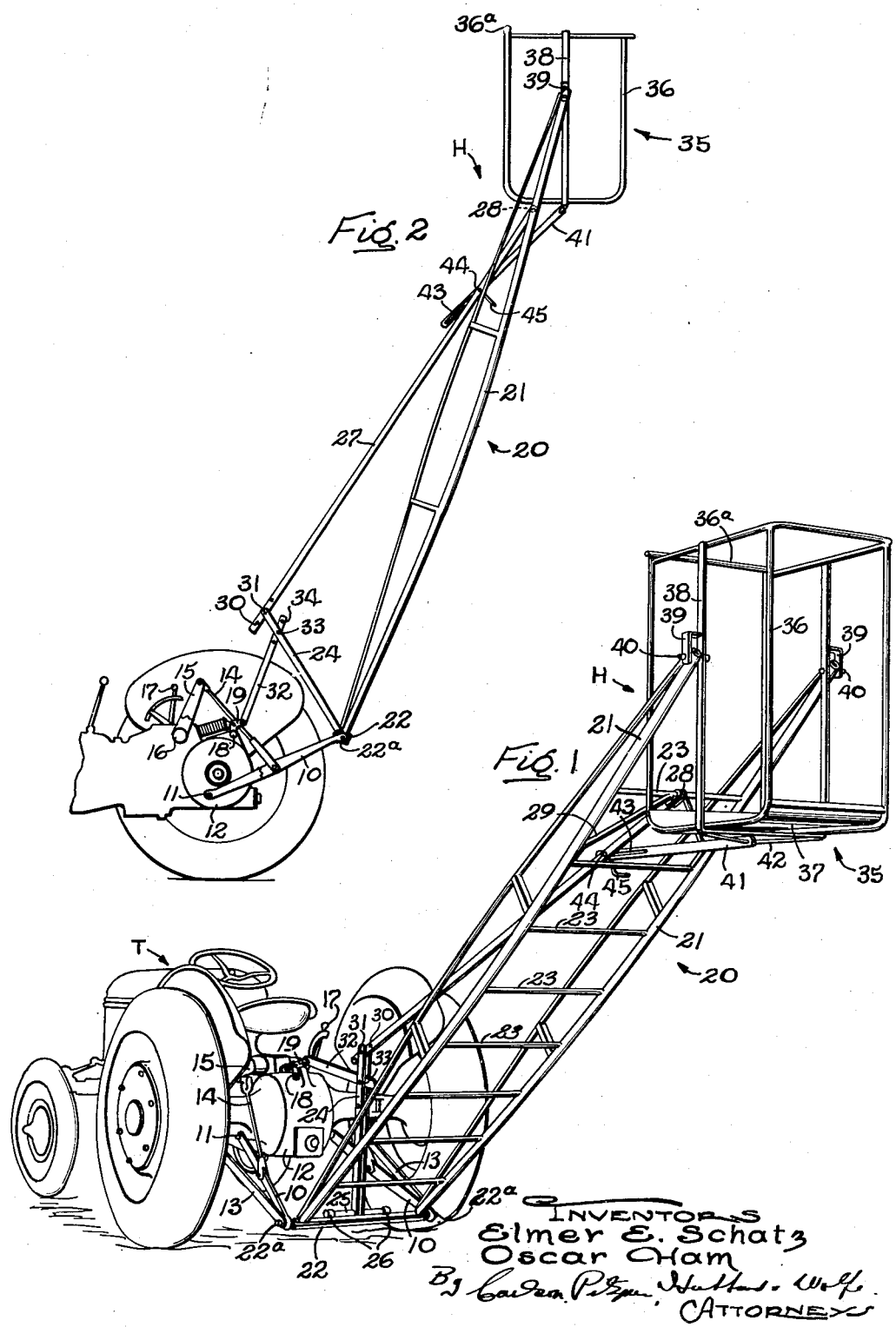

Sept. 30, 1952 E. E. SCHATZ ET AL 2,612,345
TRACTOR ATTACHMENT
Filed Nov. 13, 1945 2 SHEETS—SHEET 2
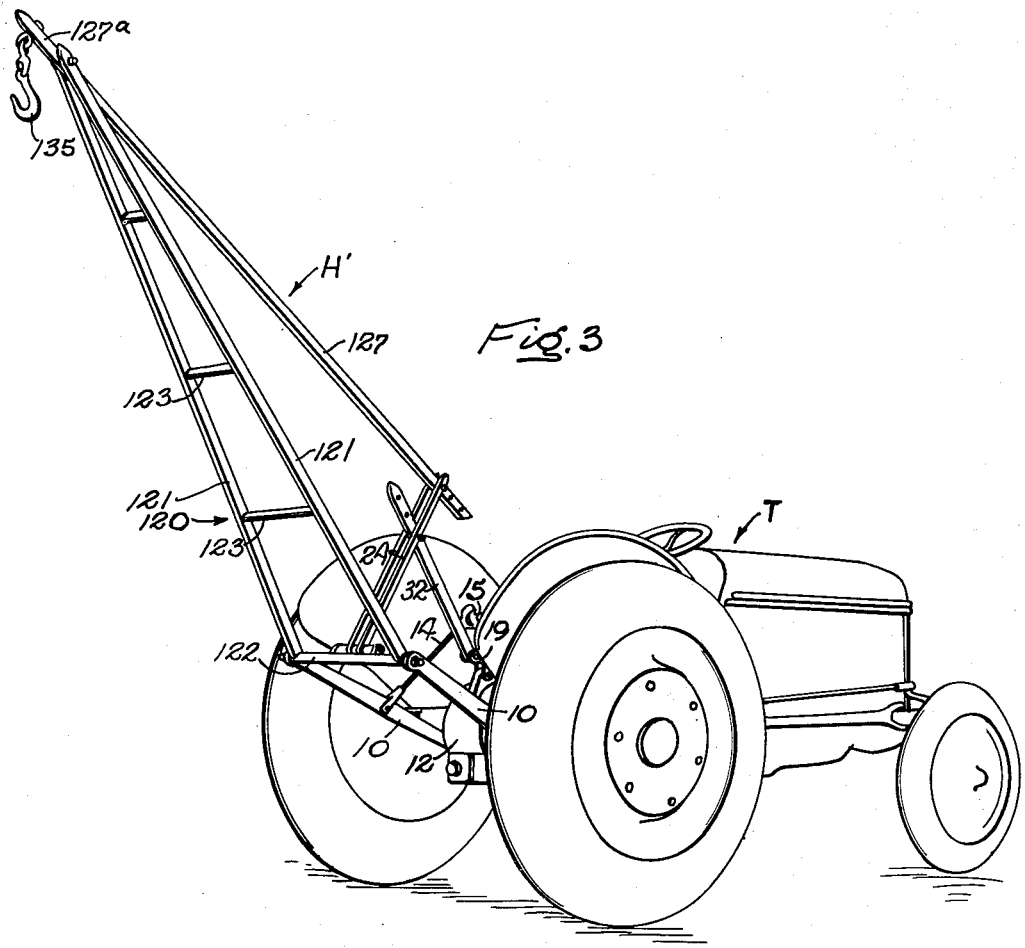
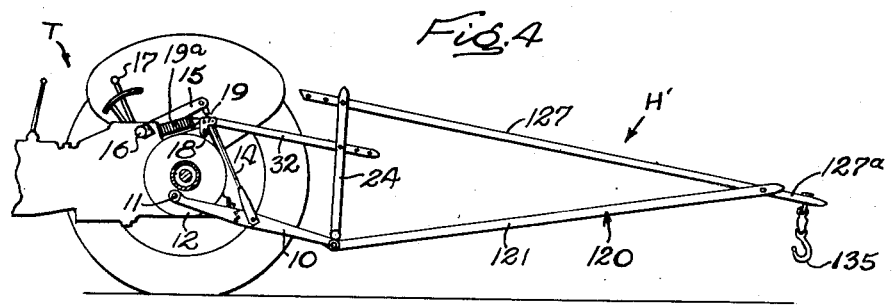

Patented Sept. 30, 1952

2,612,345

UNITED STATES PATENT OFFICE 2,612,345

TRACTOR ATTACHMENT

Elmer E. Schatz, Upper Arlington, and Oscar Ham, Amlin, Ohio, assignors to Harry Ferguson, Inc., Detroit, Mich., a corporation of Delaware Application November 13, 1945, Serial No. 628,212

6 Claims. (Cl. 254—124)

1

The present invention pertains to attachments for tractors and more particularly to attachments embodying a vertically swingable boom. Of the variety of attachments embodying such a boom and to which the present invention is applicable, two have been shown herein by way of exemplification, one being a fruit picker's hoist and the other a load lifting hoist.

One object of the invention is to provide an attachment of the character indicated which embodies a novel and simplified arrangement for lifting and lowering the boom in response to raising and lowering of the tractor-borne, power-operated draft link and on which the boom is carried.

Still another object is to provide an attachment of the general character indicated which is rugged in construction, being well adapted to withstand the exigencies of farm use, which is low in cost, and which is simple to manipulate as well as easy to install upon, or remove from, a tractor.

Further objects and advantages of the invention will become apparent as the following description proceeds, taken in connection with the accompanying drawings, in which:

Figure 1 is a perspective view of the tractor with a fruit picker's hoist attached to it which embodies the present invention.

Fig. 2 is a side elevation of the apparatus of Fig. 1, only the rear end portion of the tractor appearing and with the near wheel removed, the hoist being shown in its raised position as compared with the lowered position of Fig. 1.

Fig. 3 is a perspective view of a tractor having applied thereto a load lifting hoist, also embodying the present invention.

Fig. 4 is a side elevation of the apparatus of Fig. 3, but with only the rear portion of the tractor appearing and the near wheel removed, the hoist being shown in its lowered position as compared to the raised position shown in Fig. 3.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

Referring more particularly to the drawings, the invention has been illustrated in Figs. 1 and 2 as embodied in a fruit picking hoist H applied to a tractor T. The particular tractor chosen for purposes of illustration will be recognized by those skilled in the art as the well known lightweight Ford agricultural tractor having installed thereon the Ferguson system hitch mechanism. For further details of the latter, reference may be made to Henry George Ferguson Patent No. 2,118,180, issued May 24, 1938.

For the present, suffice it to note that a pair of draft links 10 are trailingly pivoted in side-by-side relation on the rear end portion of the tractor, being pivoted at 11 on the differential housing 12 to swing vertically. Stabilizer links 13 extend forward from the rear ends of the draft links 10 to points of suitable pivotal connection on the tractor to prevent side sway of the draft links. The draft links 10 are suspended by drop links 14 from crank arms 15 on the opposite ends of a transverse rockshaft 16. The latter is actuated by a hydraulic ram (not shown) as detailed in said Ferguson patent. Swinging a hand control lever 17 upward admits pressure fluid to the ram so that the draft links 10 are pulled upward to the position of Fig. 2 whereas when the control lever 17 is swung forward pressure fluid is exhausted from the ram so that the draft links are permitted to swing downward by gravity to the lowered position indicated in Fig. 1.

On the upper portion of the differential housing 12 is pivoted at 18 a control shackle or bell crank 19 normally provided in the Ferguson system for use in conjunction with a compression spring 19a in effecting automatic depth control of ground working implements. In the present instance, the automatic control is not utilized and the shackle 19 serves simply as a suitably located pivotal connection in attaching the implement.

It is to the draft links 10 and shackle 19 that the hoist H is shown as applied. In general, the raising and lowering of the power operated draft links is utilized for correspondingly raising and lowering the hoist, while a connection to the shackle 19 as a pivot point serves in affording a considerable mechanical advantage for lifting a load on the hoist as will appear below in somewhat more detail.

Of the hoist H itself, it will be observed that it has been shown as comprising a boom in the form of a ladder 20. Such ladder comprises side members in the form of trusses 21 rigidly attached at their lower ends to a transverse bar 22 and joined by further transverse bars 23 spaced at suitable intervals to accommodate climbing. The laterally projecting reduced end portions 22a of the bar 22 are received in the usual pivot balls upon the trailing ends of the draft links so that the ladder 20 may swing vertically about its forward or inboard end with reference to the draft links.

At the forward end of the ladder 20 is a generally upright standard 24 which is preferably pivoted to the ladder for rocking adjustment fore and aft of the ladder. In the present instance, the standard 24 comprises a pair of closely spaced upright bars rigidly attached at their lower ends to a rockshaft 25 journaled in collars 26 welded or otherwise rigidly attached to the transverse bar 22.

Leading from the upper end portion of the ladder 20 to the upper end of the standard 24 is a tension member 27, the parts 20, 24 and 27 being generally triangularly related (see Fig. 2). The upper end of the tension member 27 is pivoted at 28 to the central portion of the upper transverse bar or step 23 of the ladder, the ladder being reinforced by struts 29. At the lower or forward end of the tension member 27 on the other hand is a series of spaced holes 30 through one of which a removable pin 31 is passed to connect the tension member to the standard 24.

The connection of the standard 24 to the tractor is effected by a tension connector which in the present instance is a top link or upper draft link 32. The forward end of such link is pivoted to the shackle 19 whereas the trailing end of this link projects between the spaced side bars of the standard and is pivoted to the same by a pin 33 passing through the standard and one of a series of holes 34 in the top link. By passing the pins 31 and 33 through appropriate ones of a corresponding set of holes 30 and 34, the elevation of the ladder 20 with reference to the draft links 10 may be suitably adjusted.

Pivotally mounted on the upper or outboard end of the ladder 20 is a pulpit designated generally as 35. In the present instance this pulpit comprises a framework 36 fashioned from tubular steel members and has a sheet metal floor or platform 37. The rail 36a at the upper forward side of the pulpit frame may be hinged to swing open for entry and exit of the user. Embracing the central portion of the framework 36 is a U-shaped reinforcing member 38 having attached to it brackets 39 through which pass pivot pins 40 for pivotally connecting the pulpit to the upper ends of the ladder's side trusses 21.

To limit the swing of the pulpit 35 with reference to the ladder 20, a link 41 is provided. This link is pivoted at its upper end on a rod 42 fixed beneath the member 38, while the forward end of the link is longitudinally slotted at 43 to receive a pin 44 on the tension member 27. By turning a handle 45, a clamping nut (not shown) on the pin 44 is tightened, thus releasably holding the pulpit in a position of desired angularity with reference to the ladder 20.

The operation of the fruit picker's hoist described above will in general be clear from the foregoing. By way of brief recapitulation, let it be assumed that the hoist H is attached to the tractor and the draft links 10 on the ladder lowered to the position shown in Fig. 1. The user can readily climb the ladder 20 and enter the pulpit 35. Thereafter, the pulpit can be raised and lowered by the power lift unit on the tractor simply by manipulating the control lever 17 and the tractor can of course be driven to successive required points of use.

In the course of raising of the draft links 10 by the hydraulic lift unit on the tractor, the standard 24 is rocked forwardly by reason of its pivotal connection through the top link 32 to the pivot point on the tractor eccentric to the points 11 of pivotal attachment of the draft links. It will be apparent that the connector or top link 32 is under tension during the forward rocking movement of the standard 24. Accordingly, tension is applied to the member 27, pulling it forward. In this way a very considerable mechanical advantage is afforded for raising the ladder or beam 20 of the hoist as compared to an arrangement in which the boom constitutes simply a rigid extension of the draft links themselves.

It will be perceived by those skilled in the art that the hoist H is as a matter of fact adapted for many uses other than fruit picking. It is useful in a great variety of orchard work, in painting of buildings, and in a variety of other farm and individual tasks.

In Figs. 3 and 4, the invention has been shown as embodied in a second form of hoist H' which is of somewhat simpler construction and intended primarily only for loadlifting. This hoist has been illustrated as applied to a tractor T identical with the tractor heretofore characterized in reference to Figs. 1 and 2 and accordingly repetition of description of the tractor is unnecessary, identical reference numerals having been applied.

The hoist H' comprises a boom designated generally as 120 and constituted by rearwardly converging side members 121 joined by lower transverse bar 122 and further spaced reinforcing bars 123. The ends of the bar 122 are pivoted to the trailing ends of the draft links 10 just as in the case of the ladder or boom 20 in Figs. 1 and 2. Moreover, a generally upright standard 24 identical with the standard 24 of Figs. 1 and 2 is adjustably pivoted on the bar 122 in the same manner that the standard 24 was pivoted on the bar 22 in the first form of hoist described. Moreover, this standard is connected by a top link or upper draft link 32 identical with the top link 32 in the first form of hoist.

In Figs. 3 and 4 it will be seen that the upper end of the standard 24 is connected by a tension member 127 generally similar to the tension member 27 of Figs. 1 and 2. In this instance, however, the upper end 127a of the tension member 127 is not only pivoted between the side members 121 of the boom but projects beyond the same and has hung from it a load hook 135.

By raising and lowering the power operated draft links 10, through manipulation of the control lever 17 on the tractor, the hoist H' may readily be raised and lowered between the positions shown in Figs. 3 and 4. In the course of such movement, a high ratio of mechanical advantage is afforded through use of the standard 24, tension member 127 and top link 32 just as in the case of the hoist H of Figs. 1 and 2 previously described.

It will be perceived that either of the hoists H and H' may be readily attached and detached from the tractor. All that is required is simply the insertion or removal of the pivot pin for connecting the top link 32 to the shackle 19 and attachment or detachment of the ends of the transverse bar at the lower end of the boom to the pivot balls on the trailing ends of the draft links 10. There are thus only three simple points of connection in each case.

We claim as our invention:

1. In a hoist attachment for a tractor having vertically spaced upper and lower draft link means trailingly pivoted on its rear end portion and arranged with the lower draft link means connected to a power lift device on the tractor for vertical swing of such link means by the lift device, the combination of an elongated boom having means thereon for pivoting the inboard end thereof to the lower draft link means for vertical swing of said boom with reference to such link means, a standard rising from said inboard end of said boom, means for rigidly fixing said standard against movement with reference to said boom and in generally upright position, and means pivotally connecting the upper portion of said standard to the trailing end portion of the upper draft link means for effecting a fore and aft rocking motion of said standard and the boom connected thereto as an incident to raising and lowering of the lower draft link means.

2. In a hoist attachment for a tractor having draft link means trailingly pivoted on its rear end portion and arranged to be swung vertically by a power lift device on the tractor, the combination of an elongated boom having means thereon for pivoting the inboard end thereof to the draft link means for vertical swing of said boom with reference to the link means, a standard rising from said inboard end of said boom, means for rigidly fixing said standard against movement with reference to said boom and in generally upright position, and means including a tension connector pivotally connected to said standard and to a point on the rear end portion of the tractor eccentrically of the pivotal connections of draft links on the tractor for effecting a fore and aft rocking motion of said standard and the boom connected thereto as an incident to raising and lowering of the draft link means.

3. In a hoist attachment for a tractor having a pair of laterally spaced draft links trailingly pivoted on its rear end portion and arranged to be swung vertically by a power lift device on the tractor, the combination of a boom including a pair of elongated side members rigidly joined by transverse connecting members, means for pivoting the inboard ends of said side members to the trailing end portions of respective ones of the draft links for vertical swing of said boom with reference to the links, a standard rising from said inboard end of said boom, means for rigidly fixing said standard against movement with reference to said boom and in generally upright position, and means including an additional link pivoted to the upper portion of said standard and projecting forwardly therefrom for pivotal attachment to the rear end of the tractor at a point above the pivotal connection of said draft links to the tractor for effecting a fore and aft rocking motion of said standard and the boom connected thereto as an incident to raising and lowering of the draft links.

4. In a hoist attachment for a tractor having draft link means trailingly pivoted on its rear end portion and arranged to be swung vertically by a power lift device on the tractor, the combination of an elongated boom together with a standard and a rigid tension member all disposed in generally triangular relation with the standard rising from the inboard end of said boom and said tension member extending from the upper end of said standard to the outboard end of said boom, means for pivoting the inboard end of said boom on the trailing end portion of the draft link means, and means including an upper link pivotally connectable to the upper portion of said standard and to the rear end portion of said tractor for rocking said standard forward with a consequent pull in said tension member to raise the outboard end of said boom all in response to raising of the draft link means.

5. In a hoist attachment for a tractor having draft link means trailingly pivoted on its rear end portion and arranged to be swung vertically by a power lift device on the tractor, the combination of an elongated boom having means thereon for pivoting the inboard end thereof to the draft link means for vertical swing of said boom with reference to the link means, a standard pivoted on the inboard end of said boom for adjustable rocking movement fore and aft of the latter, a rigid tension member extending from the outboard end of said boom to the upper end portion of said standard, means for releasably connecting said standard to said tension member in any one of a plurality of predetermined positions of adjustment of said standard about its point of pivotal connection to said boom, and means including a tension connector pivotally attached at its rear end to said standard and arranged to be pivotally connected at its forward end to the tractor for effecting a fore and aft rocking motion of said standard and the boom connected thereto by said tension member as an incident to raising and lowering of the draft link means.

6. In a hoist attachment for a tractor having draft link means trailingly pivoted on its rear end portion and arranged to be swung vertically by a power lift device on the tractor, the combination of a ladder adapted to serve as a boom, means for pivoting the inboard end of said ladder to the trailing end portion of the draft link means for vertical swing of said ladder with reference to the link means, a pulpit pivotally suspended from the outboard end of said ladder, a standard rising from the inboard end of said ladder, means for rigidly fixing said standard against movement with reference to said ladder and in generally upright position, and means including an additional link pivoted to the upper portion of said standard and projecting forwardly therefrom in position for pivotal connection to the rear end of the tractor for effecting a fore and aft rocking motion of said standard and the ladder connected thereto as an incident to raising and lowering of the draft link means.

ELMER E. SCHATZ.
OSCAR HAM.

REFERENCES CITED

The following references are of record in the file of this patent:

UNITED STATES PATENTS

| Number | Name | Date |
| --- | --- | --- |
| 508,866 | Butcher | Nov. 14, 1893 |
| 634,577 | Hurlburt | Oct. 10, 1899 |
| 1,349,635 | Strauss | Aug. 17, 1920 |
| 1,761,726 | Havens | June 3, 1930 |
| 2,295,917 | Schwan | Sept. 15, 1942 |
| 2,398,585 | Hayward | Apr. 16, 1946 |